July 11, 1961

H. RAMBAUSEK 2,991,661

MULTI-SPEED TRANSMISSION WITH ONLY TWO OVERRUNNING
CLUTCHES, PARTICULARLY FOR VEHICLES

Filed April 22, 1958

INVENTOR
HUGO RAMBAUSEK,

BY Bailey, Stephens & Huettig

ATTORNEYS

July 11, 1961 H. RAMBAUSEK 2,991,661
MULTI-SPEED TRANSMISSION WITH ONLY TWO OVERRUNNING
CLUTCHES, PARTICULARLY FOR VEHICLES
Filed April 22, 1958 2 Sheets-Sheet 2
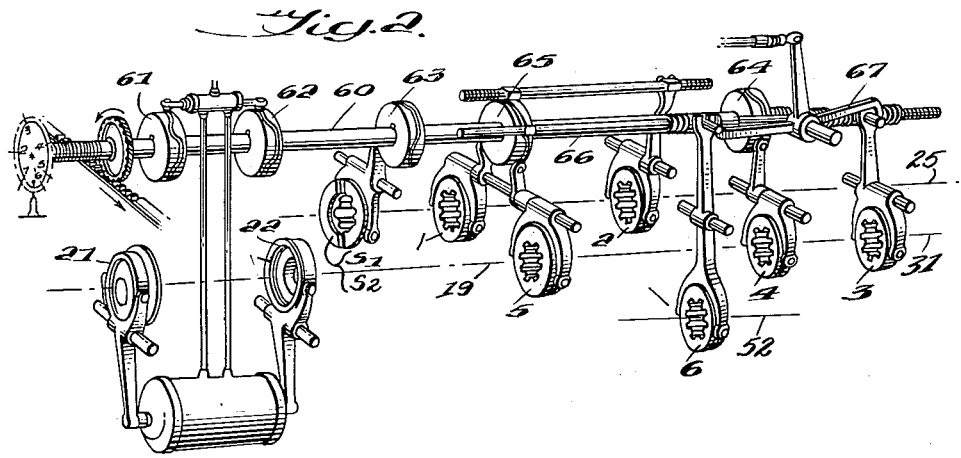
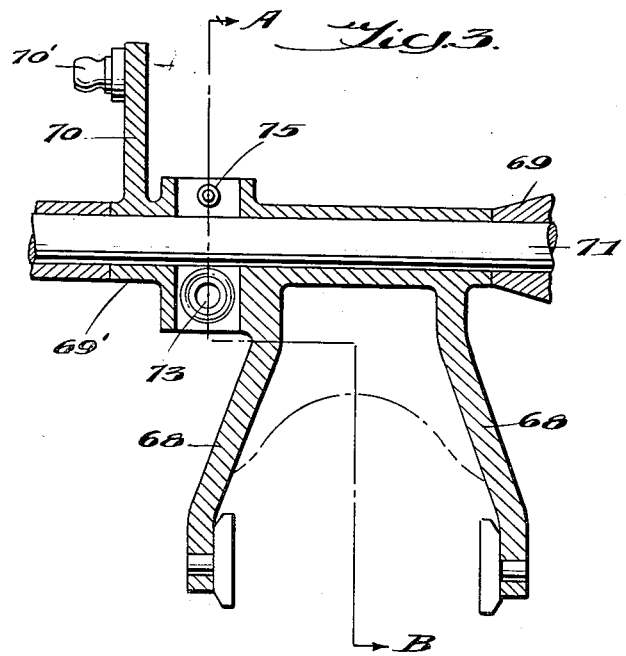
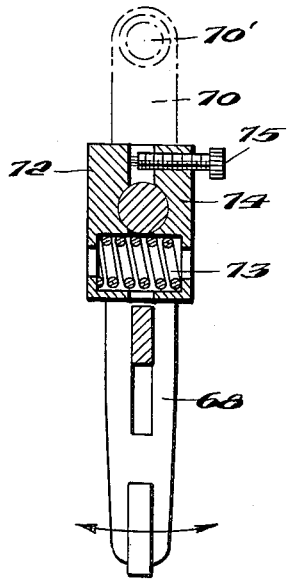
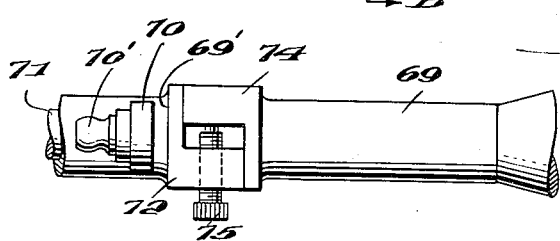
INVENTOR
HUGO RAMBAUSEK,
BY Bailey, Stephens & Huettig
ATTORNEYS

United States Patent Office 2,991,661
Patented July 11, 1961

2,991,661
MULTI-SPEED TRANSMISSION WITH ONLY TWO OVERRUNNING CLUTCHES, PARTICULARLY FOR VEHICLES
Hügo Rambaüsek, Hohenzollernstrasse 89, Munich 13, Germany
Filed Apr. 22, 1958, Ser. No. 730,175
10 Claims. (Cl. 74—330)

The present invention relates to a multiple-speed transmission, primarily for motor vehicles, which includes only two partly interconnected multiplate friction clutches at least one of which is an overrunning clutch and which may be alternately engaged to vary the various speeds of the transmission without any interruption of the power transmitted thereby. In this transmission only two synchronizing clutches are joined to the two overrunning friction clutches and the change speed gears. These two synchronizing clutches, or one alternately synchronizing clutch, constitute the synchronizing means which is co-ordinated with one of the two drive paths coming from the drive shaft for the multiple speed transmission to one of the two friction overrunning clutches, whereby this synchronizing means when engaged operates as a connection to the other drive path which both end in the output shaft of the multiple speed transmission. Thus, contrary to previously known transmissions comprising a synchronizing mechanism for each dog clutch or the like, the present invention only requires two synchronizing clutches regardless of the number of different speeds which may be desired or the number of dog clutches or the like which are to be engaged. Consequently, the transmission according to the invention is of a much simpler design, and it may be built at a much lower expense, as well as operated, controlled, and serviced much more easily and reliably than any other multiple-speed transmission previously designed. The entire transmission may also be of a very compact design and confined within a relatively small space or the two synchronizing clutches may be arranged separately from each other or be designed as synchronizing change clutches.

According to another feature of the invention, one of the two synchronizing clutches is preferably connected to a pair of gear wheels which have a reduction ratio of $1:q^2$ and form a part of a change-speed gear transmission, the gears of which are graduated in accordance with a geometrical progression ($q$ indicating herein the progressive transmission ratio). This permits the other synchronizing clutch to be connected to the driven shaft with which it is not coordinated by means of a pair of gear wheels which have a ratio of $1:1$. Consequently, only a single pair of gears is required to produce the two connections. Since each synchronizing clutch, as well as each overrunning clutch, acts only at every other speed-changing operation, this is made possible by the mentioned provision of a single pair of gears having a reduction ratio of $1:q^2$.

Another important feature of the present invention which, however, does not require any additional means involving an increase in the cost of production of the new transmission consists in the provision of an arrangement which permits one of the two synchronizing clutches to be engageable even though both overrunning clutches which may be of the friction-clutch type are disengaged. This arrangement may be employed for locking the transmission by means of suitable dog clutches or the like, preferably the same ones which are engaged in the lowest speed. Such locking of the transmission makes it possible to dispense with the normal principal clutch between the power plant or engine and the transmission, and to employ the two friction-overrunning clutches as a principal clutch. Yet, they can still be made in the form of lubricated, rather than solid-friction or dry clutches, with the result that they may be made of much smaller dimensions and may thus form only a small mass which can be quickly accelerated by the synchronizing clutches. On the other hand, since the overrunning clutches form the main primary mass, it is also possible to reduce the dimensions of the synchronizing clutches. The above-mentioned locking of the transmission insures, particularly in winter time, that the inner part of the disengaged friction-overrunning clutch will never be driven even to the slightest extent by the lubricant contained therein. Thus, not only the usual principal main clutch may be dispensed with and the friction-overrunning clutches may be made in the form of lubricated clutches, but the gear which has to be engaged for the lowest speed will also be kept in the idle position. This gear may then be easily engaged as soon as the respective synchronizing clutch has been disengaged and the transmission has been unlocked.

Aside from thus designing a multiple-speed transmission of a great simplicity and low cost which is capable of functioning very similarly to an infinitely variable transmission, but at the much higher mechanical efficiency of a normal gear transmission, it is a further object of the present invention to simplify the operation of this transmission so as to render it absolutely foolproof. For attaining this object, suitable means are provided for controlling the operation of the synchronizing clutches, the overrunning clutches, and the dog clutches of the new transmission-preferably using the same shifting order for shifting to higher and to lower speeds, for which purpose five shifting phases are provided, four of which are actuated in each shifting operation, while an additional phase is provided for taking care of the difference in the time sequence occurring between the operations of shifting to higher and lower speeds.

In order to gain the time necessary for accelerating the masses by means of the synchronizing clutches, the invention further provides a control mechanism which includes a series of cams which are preferably rotatable for controlling the synchronizing clutches, and means for automatically advancing the time of the action of these cams within the individual phases of the shifting cycle toward higher speeds with respect to the cycle of shifting to lower speeds.

If the speed-shifting means are actuated by auxiliary power means, such as an electric motor or the like, as is suitable especially in a remote-controlled transmission, the time required for the engaging phase of the friction-overrunning clutches while shifting to higher speeds will be extended with respect to the time required for the other shifting phases by interrupting the actuation of the mentioned speed-shifting means, preferably by means of an adjustable electrical timing device which is rendered inoperative while the transmission is shifting to lower speeds. Thus, the time is gained which is required for the acceleration of the vehicle which is equipped with the new transmission. This period of time may be considerably larger than that required for the coupling operations in the remaining shifting phases. Since this period of time may also vary considerably depending upon the size of the vehicle, such electric timing device is preferably provided with a large range of adjustablity.

The fact that in the transmission according to the present invention a larger number of clutches are engaged at equal intervals between the individual shifting phases, even though at a displacement of the time of the occurrence of the phases, avails still another possibility of simplifying the design and reducing the cost of production of the new transmission. This consists in utilizing a single cam for actuating two or more of the clutches, and by providing for the mentioned phase displacement by an offset arrangement of the respective elements relative to each other which are alternately acted upon by the cam.

For insuring that the various clutches may be positively engaged by common actuating means but without interfering with each other, the invention further provides suitable spring means or the like which are effective in the direction of engagement of the individual clutches, and which are ineffective in the opposite direction so that the disengaging operation will occur very suddenly.

Finally, still another feature of the invention consists in positively connecting the clutch for the reversing gear to the common speed-shifting mechanism. For this purpose, the invention provides a direction-reversing switch which is equipped with a locking device whereby the clutch for the first and second forward speeds, which connects the shaft carrying the synchronizing clutches to the output shaft, will be automatically disengaged when the reversing clutch is being engaged.

These, as well as further objects, features, and advantages of the present invention will become more clearly apparent from the following detailed description thereof, particularly when read with reference to the attached drawings of one preferred embodiment of the invention, in which—

FIGURE 1 shows a diagrammatical sectional view of a multiple-speed transmission according to the invention;

FIGURE 2 shows a perspective view of the clutch control means according to the invention;

FIGURE 3 shows a longitudinal section through one of the shifting forks;

FIGURE 4 shows a plan view of the shifting fork according to FIGURE 3; while

FIGURE 5 shows a cross section taken along the line A—B in FIGURE 3.

The multiple-speed transmission according to the invention may be controlled either by hand or automatically. Referring to FIGURE 1, the power of an engine or other driving force may be transmitted through a shaft 10 to a front plate 11 of a clutch cylinder 12 which contain two friction-type overrunning clutches A and B, and which constantly and positively drives the corresponding outer clutch disks 13. The inner clutch disks 14 of each clutch are mounted on nutlike members 15 loaded by springs 15a and which are provided with high-pitch threads 16 and are screwed on the corresponding threads on the two inner clutch parts or screws 17 and 18, respectively. The screw part 17 of clutch A is secured to a shaft 19, while screw part 18 of clutch B is secured to a hollow shaft 20 which is freely rotatable on shaft 19. The engagement of either clutch is effected through contact or pressure members 21 and 22, respectively, which then press the outer and inner clutch disks 13 and 14 of the respective clutch against each other. Either high-pitch thread 16 is shaped so that the respective overrunning shaft 19 or 20 withdraws the inner clutch disks 14 from the respective pressure members 21 or 22 and thus disconnects the clutch automatically and independently of the actuation of pressure member 21 or 22.

A gear wheel 23 is mounted on hollow shaft 20 and meshes with a gear wheel 24 which is mounted on one end of a shaft 25 which extends parallel to shafts 19 and 20 and carries a further gear wheel 26 at its other end. The interengaging gear wheels 23 and 24 have a gear ratio of $1:q$. Shaft 25 further carries a dog clutch 2 which is adapted to connect this shaft to a hollow shaft 27 which is freely rotatable on shaft 25 and carries a gear wheel 28, and well as a dog clutch 1, which is adapted to engage with a gear wheel 29 which is likewise freely rotatable on shaft 25. Gear wheel 29 meshes with another gear wheel 30 mounted on the free end of shaft 19 and has a gear ratio relative to the latter of $q^2:1$. Gear wheel 30 is adapted to be connected to the output shaft 31 through a dog clutch 5. A gear wheel 32 which is freely rotatable on output shaft 31 meshes with gear wheel 28 on hollow shaft 27 and is adapted to be connected to output shaft 31 through a dog clutch 4. Gear wheels 28 and 32 have a gear ratio of 1:1. Finally, a gear wheel 33 which is freely rotatable on output shaft 31 meshes with a gear wheel 26 mounted on shaft 25 and is adapted to be connected to output shaft 31 through a dog clutch 3. Gear wheel 33 has a gear ratio of $q^2:1$ to gear wheel 26.

Now, in accordance with the invention, two synchronizing friction clutches $S_1$ and $S_2$ are mounted on shaft 25. The inner clutch disks 40 of both clutches are directly conected to shaft 25 in the direction of rotation, while the outer clutch disks 41 of clutch $S_2$ are connected to gear wheel 29 through an annular web 42, and the outer clutch disks 43 of clutch $S_1$ are connected through an annular web 44 to an additional gear wheel 45 which is in constant engagement with a gear wheel 46 which is rigidly secured on shaft 19 and has a gear ratio of 1:1 to gear wheel 45. Both synchronizing clutches $S_1$ and $S_2$ are both alternately and independently engageable and disengageable by suitable means which will be subsequently described.

As previously indicated, it is an important feature of the invention that, while the transmission is being shifted to any higher speeds, there will never be any interruption of the power output.

The operation of shifting the transmission to higher and lower speeds is as follows:

SHIFTING UP

*First speed*

The drive shaft 10 of the engine drives clutch cylinder 12. By the operation of pressure member 21, overrunning clutch A is engaged, the power then being transmitted through the outer clutch disks 13 and inner clutch disks 14 to the nutlike member 15 carrying the latter, and then through the high-pitch threads 16 and the inner clutch part 18 mounted on shaft 19 to gear wheel 30 which is in constant mesh at a ratio of $1:q^2$ with the larger gear wheel 29 which, with dog clutch 1 being engaged, transmits the power through hollow shaft 27 and the likewise engaged dog clutch 2 to shaft 25 and then through the small gear wheel 26 on shaft 25 at a ratio of $1:q^2$ to the larger gear wheel 33 which normally is freely rotatable on shaft 31. However, since dog clutch 3 is also engaged, it transmits the power from gear wheel 33 to output shaft 31 which thus rotates at a speed of $n:q^4$. Since shaft 25 which is driven at a ratio of $1:q^2$ also carries gear wheel 24 which meshes with gear wheel 23 on hollow shaft 20, and since the two wheels have a gear ratio of $q:1$, nut 15 which carries the inner clutch disks 14 of clutch B is driven at a slower speed than engine shaft 10 and clutch cylinder 12. Because of such slower speed of nut 15 and the high-pitch threads 16 thereon, clutch B may subsequently be easily and surely engaged for the next higher speed. As already stated above, output shaft 31 is driven in the first speed at a rate of $n:q^4$.

*Second speed*

By the operation of pressure member 22, overrunning clutch B will then be engaged. The outer clutch disks 13 and inner clutch disks 14 of clutch B then transmit the power to nut 15, and through its high-pitch threads 16' to the inner clutch part or screw 18 which is secured to hollow shaft 20 and thus drives gear wheel 23 thereon which engages at a gear ratio of $1:q$ with the larger gear wheel 24 which is secured on shaft 25. The smaller gear wheel 26 at the other end of shaft 25 then transmits the power to the large gear wheel 33 at a ratio of $1:q^2$, and since dog clutch 3 is still engaged, gear wheel 33 transmits the power to the output shaft 31. Since dog clutches 2 and 1 are still engaged, hollow shaft 27 is at the same time driven at a speed of $n:q$ and transmits this speed at a ratio of $q^2:1$ to shaft 19 so that the latter will rotate at a higher speed than drive shaft 10, and, through the high-pitch threads 16, will turn nut 15 in the reverse direction and automatically disengage the overrunning clutch A and render the same ineffective.

In the second shifting phase of the second speed, overrunning clutch A is disengaged either manually and/or by electric, pneumatic or hydraulic means, by the withdrawal of pressure member 21. Simultaneously, dog clutch 2 is disengaged so that hollow shaft 27 will be disconnected from shaft 25. Shaft 19 of clutch A will then slow down, with the result that the screw part 16 will automatically screw nut 15 forwardly to its original position so that overrunning clutch A will then be ready for the next speed-shifting operation. Thus, for this speed, clutch cylinder 12 remains connected to output shaft 31 with the power then being transmitted through the engaged clutch disks of overrunning clutch B, nut 15 which through its high-pitch threads is firmly fixed on hollow shaft 20, then through the latter and gear wheels 23 and 24, which have a ratio of $1:q$, to shaft 25, and then through gear wheels 26 and 33, which have a ratio of $1:q^2$, to output shaft 31. Consequently, output shaft 31 is driven at a speed of $n:q^3$.

*Third speed*

Synchronizing clutch $S_1$ is then engaged whereby shaft 25 drives shaft 19 through gears 45 and 46, which have a ratio of $1:1$, while shaft 19, through gears 30 and 29 with a ratio of $1:q^2$, dog clutch 1, and hollow shaft 27, drives gear wheels 28 and 32 which have a ratio of $1:1$. Gear wheel 32 is then fully synchronized with output shaft 31, and the two members of the disengaged dog clutch 4 will run at identical speeds. Then, synchronizing clutch $S_1$ is disengaged and simultaneously dog clutch 4 is engaged. Since hollow shaft 27 still runs at the second speed, that is, at a rate of $n:q^3$, as stated above, and since gear wheels 29 and 30 still rotate at a speed of $n:q$, the overrunning clutch A will be driven at a lower speed and may then be engaged for the third speed. This may be attained by an operation of the pressure member 21. The power then flows from drive shaft 10 through overrunning clutch A, shaft 19, gear wheels 30 and 29, dog clutch 1, hollow shaft 27, gear wheels 28 and 32, and dog clutch 4, to output shaft 31, and at a rate of speed of $n:q^2$. This, in turn, means that shaft 25 will be driven through gear wheels 33 and 26 at a speed $n$. Since shaft 25 is connected through gear wheels 24 and 23 to hollow shaft 20 of overrunning clutch B, this shaft will then be driven at a rate of $n:q$. Consequently, the screw part 18 of this clutch will accelerate so that clutch B will disengage, while at the same time dog clutch 3 on output shaft 31 will also be disengaged. Thus, in the third speed, output shaft 31 is driven along the path mentioned above at a rate of speed of $n:q^2$.

*Fourth speed*

By the engagement of synchronizing clutch $S_2$, shaft 25 will be driven at a speed of $n:q^2$, so that the disengaged dog clutch 2 will also rotate at the speed of hollow shaft 27. The two members of dog clutch 2 thus being fully synchronized, clutch 2 may then be engaged. Thereupon, overrunning clutch B will be engaged which, in turn, will engage the fourth speed. The power then flows from drive shaft 10, through clutch cylinder 12, clutch disks 13 and 14 of clutch B, nut 15, screw 18, hollow shaft 20, gear wheels 23 and 24, shaft 25, dog clutch 2, hollow shaft 27, gear wheels 28 and 32, and dog clutch 4, to output shaft 31. Since hollow shaft 27 is then being driven at a rate of $n:q$ and, in turn, drives shaft 19 through gear wheels 29 and 30 with a ratio of $q^2:1$, shaft 19 will rotate at a speed of $n:q$, with the result that the overrunning clutch A will automatically and immediately disengage. Thereupon, clutch A will also be disengaged by the operation of pressure member 21, and dog clutch 1 will likewise be disengaged. Consequently, the speed of shaft 19 will further decrease, and nut 15 of clutch A will return to its original position and thus be ready for the engagement of the fifth speed. Thus, in the fourth speed, the power is transmitted from driving shaft 10 along the path mentioned above to output shaft 31 to drive the same at a rate of $n:q$.

*Fifth speed*

By the engagement of synchronizing clutch $S_1$, shaft 19 will be synchronized through gears 45 and 46 to the rate of the output shaft in the fourth speed, namely, $n:q$. Consequently, dog clutch 5 may then be closed so as to connect shaft 19 directly to output shaft 31. Nut 15 of overrunning clutch A carrying the inner clutch disks 14 will then also rotate at the speed of $n:q$. Synchronizing clutch $S_1$ will then be disengaged, while overrunning clutch A will be engaged whereby output shaft 31 will be driven in the direct speed, that is, the fifth speed, at the rate of drive shaft 10. At the same time, since dog clutch 3 on the output shaft 31 is still engaged with gear 33, and the latter engages with gear wheel 26 at the ratio of $q^2:1$, shaft 25 is driven and, in turn, through gear wheels 24 and 23 with a ratio of $q:1$, drives the overrunning clutch B and disengages the same by returning nut 15 thereof to its original position as soon as dog clutch 3 on output shaft 31 is disengaged from gear wheel 33. Thereupon, overrunning clutch B will be disengaged by the operation of pressure member 22 and is thus ready for the engagement of the sixth speed. The rate of speed of the transmission in the fifth speed is therefore the same as that of drive shaft 10, that is, $n$.

*Sixth speed*

By the engagement of synchronizing clutch $S_2$, shaft 25 will be driven at a speed of $n:q^2$ so that the two members of clutch 1 on shaft 25 and on hollow shaft 27 will be synchronized, allowing clutch 1 to be engaged. When overrunning clutch B is then engaged by the operation of pressure member 22, the transmission runs in the sixth speed, the power then being transmitted from drive shaft 10, clutch cylinder 12, gear wheels 23 and 24 $(1:q)$, shaft 25, dog clutch 2, hollow shaft 27, dog clutch 1, gear wheels 29 and 30, and dog clutch 5 to output shaft 31. Simultaneously, through shaft 19, overrunning clutch A overruns and disengages automatically, whereupon it is also disengaged by the operation of pressure member 21. The rate of speed of the transmission in the sixth speed is $n \times q$.

The power transmission of the different forward speeds as shown in FIGURE 1 and as above described may thus once more be recapitulated as follows:

1st speed $(n:q^4)$: A–19—30—29—1—27—2—25—26—33—3—31

2nd speed $(n:q^3)$: B–20—23—24—25—26—33—3—31

3d speed $(n:q^2)$: A–19—30—29—1—27—28—32—4—31

4th speed $(n:q)$: B–20—23—24—25—2—27—28—32—4—31

5th speed $(n)$: A–19—5—31

6th speed $(n \times q)$: B–20—23—24—25—2—27—1—29—30—5—31

SHIFTING DOWN

*From sixth to fifth speed*

For shifting the transmission from the sixth to the fifth speed, overrunning clutch A is engaged, although it still overruns due to the higher rate of rotation of shaft 19 from the sixth speed. Thereupon, the overrunning clutch B is disengaged, whereby the speed of output shaft 31 is retarded until clutch A no longer overruns and nut 15 thereof engages clutch disks 14 and 13 with each other. The transmission will then run in the fifth speed, and output shaft 31 will rotate at the same speed as drive shaft 10. Thereupon, dog clutch 1 which connects gear wheel 29 to hollow shaft 27 will be disengaged.

*From fifth speed to fourth speed*

The power is transmitted from drive shaft 10 through clutch cylinder 12 and overrunning clutch A to shaft 19. Synchronizing clutch $S_1$ is then engaged whereby, through gear wheels 46 and 45, shaft 25 is synchronized, through dog clutch 2 and gear wheels 28 and 32, with dog clutch 4 on output shaft 31. Synchronizing clutch $S_1$ will then be disengaged, while dog clutch 4 will be engaged. The transmission is thus prepared to run in the fourth speed. Overrunning clutch B is then engaged by the operation of pressure member 22. Thereafter, overrunning clutch A is disengaged, output shaft 31 decelerates until it attains the rate of the fourth speed of $n:q$, and simultaneously, through nut 18, clutch disks 14 and 13 will be automatically engaged so that the transmission will run in the fourth speed. Shifting to the other lower speeds may then be carried out accordingly.

In any lubricated friction clutch, even though fully disengaged, it easily occurs, especially in winter time and at a cold start, that a very viscous oil within the clutch will tend to transmit the driving power, at least to some extent, between the outer and inner clutch disks and result in a creeping of the clutch of the driven shaft connected thereto, and consequently also of the output shaft and thus of the entire vehicle. Such creeping of the overrunning clutches A and B may be entirely prevented according to the present invention. If drive shaft 10 rotates and both overrunning clutches A and B are disengaged, and if there may be any danger that the lubricant within these clutches might be so thick as to transmit the driving power to the inner clutch disks or other driven elements within clutch cylinder 12, it is merely necessary to engage synchronizing clutch $S_1$ as well as dog clutches 1 and 2. Synchronizing clutch $S_1$ will then act as a brake upon the transmission and absolutely prevent even the slightest rotation of shafts 19 and 20.

The new transmission may also be equipped with a reverse drive, as indicated in dotted lines in Figure 1 so as not to confuse with the elements required for the forward-driving speeds. For this purpose, a gear wheel 50 may be mounted on the countershaft 25. Although illustrated separately from each other, this gear wheel 50 is intended to mesh constantly with a gear wheel 51 mounted on a shaft 52. This shaft also carries slidably thereon a dog clutch 6 which is adapted to be engaged with a gear wheel 53 which is freely rotatable on shaft 52 and constantly in mesh with a gear wheel 54 secured on onput shaft 31. The power transmission for the first and second reverse speeds is the same as that for the first and second forward speeds except for dog clutches 3 and 6. Therefore, in these speeds, it is only necessary to engage the reversing clutch 6 instead of the forward clutch 3 to reverse the direction of rotation of output shaft 31.

FIGURE 2 is a perspective view of the preferred clutch control means in the form of a control shaft 60 with cams 61 and 62 mounted thereon which are cooperatively associated with the two friction-overrunning clutches A and B, respectively. Another cam 63 mounted on control shaft 60 is provided for the alternating actuation of the two synchronizing clutches $S_1$ and $S_2$. Two further cams mounted on shaft 60 serve for the actuation of the dog clutches, namely, cam 64 for actuating dog clutch 4 and cam 65 for actuating all of the other dog clutches 1, 2, 5, 3 and 6. Such a common actuation of all of these clutches by only one cam 65 is possible because the distances between its different shifting phases are all alike, while the difference in the time sequence between the individual shifting operations is taken into account by the offset arrangement of the respective elements which bear upon cam 65 relative to each other.

Only dog clutches 3 and 6, in this respect, cooperate with the same element, namely, a shaft 66, since either only clutch 3 can be engaged in the forward-driving direction, or only clutch 6 in the reverse-driving direction. For this purpose, positive coupling connections, such as springs, are provided between the respective shifting forks and shaft 66, while a double lever 67 which may be operated by a direction-control switch, or by another lever or other suitable means, not shown, will lock one or the other of these forks and prevent any possible engagement of one of these clutches 3 or 6, while the other is engaged.

Figures 3, 4, and 5 illustrate a preferred design of the shifting fork for one of the other clutches, and the manner in which such fork may be positively shifted by the respective cam in the direction of engagement of the clutch. Each of these shifting forks essentially consists of a pair of interconnected arms 68 which are adapted partly to encompass and engage with the respective movable clutch member, as shown in Figure 2, and which are mounted by means of a tubular part 69 on a stationary shaft 71 so as to be freely pivotable about the axis of such shaft. At one end, the tubular part 69 has a flanged portion 74 which is angularly offset or recessed, as shown particularly in Figs. 4 and 5. Another tubular member 69' with a corresponding offset portion 72 interengaging with portion 74 is likewise rotatably mounted on shaft 71 and carries an arm 70 with a pin 70' therein which is adapted to ride within the cam groove of one of the cams. At one side of shaft 71, the two offset portions 72 and 74 have inner corresponding socketlike recesses containing a compression spring 73, while at the opposite side of shaft 71, one of the offset portions contains an adjustable setscrew 75 which is adapted to bear upon the other offset portion. By this arrangement, when the shifting fork is pivoted in one direction, it will insure a quick and effective engagement of the clutch dogs by the action of spring 73, while when pivoted in the other direction, it will positively disengage the clutch dogs by the action of setscrew 75. Such sure engagement of the clutch dogs will be further aided if the synchronization will be discontinued as soon as the two members of the respective clutch run at the identical speed so that the actual engagement will occur at the moment of the least possible change in the angle of rotation.

Although my invention has been illustrated and described with reference to the preferred embodiments thereof, I wish to have it understood that it is in no way limited to the details of such embodiments, but is capable of numerous modifications within the scope of the appended claims.

This application is a continuation-in-part of my application filed February 21, 1955, Serial No. 489,600, for "Multi-Speed Change-Speed-Gear With Only Two Preconnected Friction-Overrunning Clutches, Preferably for Vehicles," now abandoned.

Having thus fully disclosed my invention, what I claim is:

1. A multiple speed transmission shiftable from one speed to another without interrupting the transmission of power, comprising an input drive shaft, two coaxial multiple disc friction clutches joined to said drive shaft by a connecting member common to both friction clutches, a driven shaft for each friction clutch, respectively, a spring-loaded threaded overrunning nut member connecting each friction clutch to its respective driven shaft, a third shaft, a first gear train having a first gear ratio connecting said third shaft to the driven shaft of one of said friction clutches, a third and a fourth clutch each constituting a multiplate synchronizing clutch mounted on said third shaft, a second and a third gear train of different gear ratios from each other, and from said first gear train, connecting each synchronizing clutch, respectively, to the driven shaft of the other of said friction clutches, and means for actuating each clutch for rotating said third shaft at one of three different speeds depending upon which gear train is activated by its respectively engaged clutch.

2. A transmission as in claim 1, each gear train comprising at least two constantly meshed gears.

3. A transmission as in claim 1, further comprising a hollow shaft concentric with and freely rotatable upon said third shaft, at least one fourth gear secured to said hollow shaft, a fifth clutch axially slidable upon and rotatable with said hollow shaft and engageable with said third gear for said fourth synchronizing clutch, a fourth driven output shaft, a fifth gear freely rotatable upon said fourth shaft and meshed with said fourth gear, a pair of sixth and seventh gears one of which is secured to said third shaft and the other of which is freely rotatable on said fourth shaft, a sixth clutch interconnecting said third shaft with said fourth gear, a seventh clutch on said fourth shaft for connecting said seventh gear with said fourth shaft, an eighth clutch on said fourth shaft for interconnecting said fourth shaft with said fourth gear to drive either said hollow shaft or said third shaft, respectively, through said sixth clutch, a ninth clutch for connecting said fourth shaft to said driven shaft of the other of said friction clutches, said fifth to ninth clutches being dog clutches, and means for alternately engaging one of said friction clutches while one of said third or fourth clutches is engaged to synchronize the speed of one of the following dog clutches and its respective shaft with its engageable counterpart, said counterpart being driven from the drive output side of the transmission, so as to shift said transmission to the next following speed.

4. A transmission as in claim 3, said first gear train and said second gear train having a progressive gear ratio $q$ of a geometrical progression, and said third gear train having a gear ratio of 1:1.

5. A transmission as in claim 4, said transmission being locked by engaging said fifth and sixth clutches and said third clutch when said first and second clutches are disengaged.

6. A transmission as in claim 4, further comprising cam means for actuating said first four clutches and for either engaging or disengaging the clutches in the transmission train following said first four clutches.

7. A transmission as in claim 4, further comprising auxiliary power means connected to said overrunning friction clutches for extending the time of their engagement while the transmission is shifted to a higher speed.

8. A transmission as in claim 4, further comprising cam means connected in common with said fifth to ninth clutches for actuating at least two of said fifth to eighth clutches according to their temporal phase displacement.

9. A transmission as in claim 4, further comprising spring means connected to each clutch of said fifth to ninth clutches for actuating said each clutch only in clutch engaging direction.

10. A transmission as in claim 8, further comprising reversing means composed of a first reversing gear secured to said third shaft, a second reversing gear secured to said fourth shaft, a fifth driven shaft, a pair of reversing gears mounted on said fifth shaft with one of said pair of gears being freely rotatable on said fifth shaft and meshed with said second reversing gear and the other of said pair of reversing gears being fixed to said fifth shaft and meshed with said first reversing gear, a reversing clutch on said fifth shaft for engaging said freely rotatable gear with said fifth shaft, and two members for actuating said reversing gear means, one of said members being engaged with said reversing clutch while the other member is connected to said seventh clutch to disengage said seventh clutch before engaging said reversing clutch.

References Cited in the file of this patent
UNITED STATES PATENTS 2,654,261    Youngren et al. _____ Oct. 6, 1953
2,739,487    Winther _____ Mar. 27, 1956